(12) United States Patent
Kinoshita et al.

(10) Patent No.: US 9,856,977 B2
(45) Date of Patent: Jan. 2, 2018

(54) SHIFT CONTROL DEVICE

(71) Applicant: FUJI JUKOGYO KABUSHIKI KAISHA, Tokyo (JP)

(72) Inventors: Takahiro Kinoshita, Tokyo (JP); Masato Igarashi, Tokyo (JP); Koichiro Terai, Tokyo (JP); Koichi Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 79 days.

(21) Appl. No.: 14/907,813

(22) PCT Filed: Jun. 24, 2014

(86) PCT No.: PCT/JP2014/066653
§ 371 (c)(1),
(2) Date: Jan. 26, 2016

(87) PCT Pub. No.: WO2015/015954
PCT Pub. Date: Feb. 5, 2015

(65) Prior Publication Data
US 2016/0160999 A1 Jun. 9, 2016

(30) Foreign Application Priority Data

Jul. 31, 2013 (JP) ................................. 2013-159809

(51) Int. Cl.
*F16H 59/54* (2006.01)
*F16H 61/16* (2006.01)
(Continued)

(52) U.S. Cl.
CPC ............ *F16H 61/16* (2013.01); *F16H 59/54* (2013.01); *F16H 59/66* (2013.01); *F16H 61/18* (2013.01);
(Continued)

(58) Field of Classification Search
CPC .......... F16H 61/16; F16H 63/42; F16H 59/66; F16H 61/18; F16H 59/54;
(Continued)

(56) References Cited

U.S. PATENT DOCUMENTS

2009/0298645 A1 * 12/2009 Wang ..................... B60W 10/06
477/111
2010/0206118 A1 * 8/2010 Nagashima ............. F16H 61/18
74/473.18
(Continued)

FOREIGN PATENT DOCUMENTS

DE          10139855 A1 *  3/2003  ............. B60K 28/10
JP       2007032819 A  *  2/2007
(Continued)

OTHER PUBLICATIONS

English translation of JP2013024266A; translationportal.epo.org, Jun. 5, 2017.*
(Continued)

*Primary Examiner* — Roger L Pang
(74) *Attorney, Agent, or Firm* — Chip Law Group

(57) ABSTRACT

[Object] To provide a shift control device that, in a shift control device of a vehicle equipped with an idling-stop mechanism and a shift-by-wire mechanism, is capable of preventing setting off at a timing that the driver does not expect when returning from an idling-stop state.

[Solution] The SBW-CU (40) that constitutes the shift control device (1), in the case of selection information for selecting the R range being output during an idling stop, switches the shift range of the automatic transmission (10) to the R range when the vehicle is braked, and switches the shift range to the N range or the P range when the vehicle is not braked and the shift range of the automatic transmission (10) is the D range. Also, the SBW-CU (40), in the case of selection information for selecting the R range being output
(Continued)

during an idling stop, maintains the shift range without switching it when the vehicle is braked and the shift range of the automatic transmission (10) is other than the D range.

8 Claims, 2 Drawing Sheets

(51) Int. Cl.
*F16H 61/18* (2006.01)
*F16H 59/66* (2006.01)
*F16H 63/42* (2006.01)
*F16H 59/70* (2006.01)
*B60W 10/10* (2012.01)
*B60W 10/04* (2006.01)
*F16H 59/74* (2006.01)
*F16H 59/10* (2006.01)

(52) U.S. Cl.
CPC ............. *F16H 63/42* (2013.01); *B60W 10/04* (2013.01); *B60W 10/10* (2013.01); *B60Y 2300/18016* (2013.01); *F16H 59/105* (2013.01); *F16H 2059/663* (2013.01); *F16H 2059/708* (2013.01); *F16H 2059/746* (2013.01); *F16H 2063/423* (2013.01); *Y10T 477/647* (2015.01); *Y10T 477/6934* (2015.01); *Y10T 477/6935* (2015.01)

(58) Field of Classification Search
CPC ......... F16H 2059/663; F16H 2063/423; F16H 2059/708; F16H 2059/746; B60Y 2300/18016; B60W 10/10; B60W 10/04; Y10T 477/647; Y10T 477/6934; Y10T 477/6935
See application file for complete search history.

(56) References Cited

U.S. PATENT DOCUMENTS

| 2011/0025488 | A1* | 2/2011 | Leon | B60K 37/06 340/456 |
| 2013/0325273 | A1* | 12/2013 | Reuter | B60W 10/04 701/54 |

FOREIGN PATENT DOCUMENTS

| JP | 2010-173607 A | 8/2010 |
| JP | 2013024266 A * | 2/2013 |

OTHER PUBLICATIONS

English translation of JP2007032819A; translationportal.epo.org, Jun. 5, 2017.*

* cited by examiner

SHIFT CONTROL DEVICE

TECHNICAL FIELD

The present invention relates to a shift control device, and in particular relates to a shift control device of a vehicle having an idling-stop mechanism and a shift-by-wire mechanism.

BACKGROUND ART

In recent years, there have been put to practical use vehicles equipped with a shift-by-wire (SWB) mechanism that electrically switches the shift range of an automatic transmission by detecting with a switch or the like the shift range that the driver has selected, and driving an actuator of an electric motor or the like based on the detection result (for example, refer to Patent Literature 1).

Also, from the standpoint of improving the vehicle's fuel consumption and reducing exhaust gas, there has been an increase in vehicles having an idling-stop function that automatically stops the engine when for example waiting for the light to change at an intersection.

CITATION LIST

Patent Literature

Patent Literature 1: Japanese Unexamined Patent Application Publication No. 2010-173607

SUMMARY OF INVENTION

Technical Problem

In a vehicle having a conventional shift-by-wire mechanism, when the reverse travel range (R range) is selected during an idling stop, whereby the shift range of the automatic transmission is switched to the reverse travel range, when the engine is automatically restarted as a result of the idling stop being released, for example, when the brake pedal is not depressed, drive power is generated at a timing the driver does not expect, and so there has been the risk of the vehicle starting to move rearward.

The present invention was achieved for solving the aforementioned problem, and has as its object to provide a shift control device that is capable of preventing setting off at a timing the driver does not expect when returning from an idling-stop state (during engine automatic restart), in a shift control device of a vehicle equipped with an idling-stop mechanism and a shift-by-wire mechanism.

Solution to Problem

According to the present invention, a shift control device of a vehicle equipped with an idling-stop mechanism and a shift-by-wire mechanism, includes: a selection means that receives an operation to select a shift range of an automatic transmission and outputs a selection information corresponding to the operation; a switching control means that switches the shift range of the automatic transmission in accordance with the selection information output by the selection means; and a braking means that brakes the vehicle. The switching control means, in a case of a selection information for selecting a reverse travel range being output by the selection means during an idling stop, switches the shift range of the automatic transmission to the reverse travel range when the vehicle is braked by the braking means, and switches the shift range of the automatic transmission to a neutral range or a parking range when the vehicle is not braked and the shift range of the automatic transmission is a forward travel range.

According to the shift control device of the present invention, in the case of selection information for selecting the reverse travel range being output during an idling stop, the range of the automatic transmission is switched to the neutral range or the parking range when the vehicle is not braked and the shift range of the automatic transmission is the forward travel range. For that reason, even if the idling stop is released whereby the engine is automatically restarted, because drive power is not transmitted to the wheels, even if the vehicle is not braked, the vehicle is prevented from starting to move. Thereby, it is possible to prevent setting off at a timing that the driver does not expect when returning from an idling-stop state (during engine automatic restart). Note that the shift range of the automatic transmission is switched to the reverse travel range when the vehicle is braked, but at this time the vehicle is braked, and thus there is no setting off of the vehicle (starting to move rearward) against the intention of the driver.

In the shift control device according to the present invention, it is preferable that the switching control means, in a case of the selection information for selecting the reverse travel range being output by the selection means during the idling stop, maintains the shift range of the automatic transmission without switching the shift range of the automatic transmission when the vehicle is not braked and the shift range of the automatic transmission is other than the forward travel range.

In this case, the shift range of the automatic transmission is maintained in a range other than the forward travel range, that is, the neutral range or the parking range, without being switched to the reverse travel range. For that reason, even if the idling stop is released whereby the engine is automatically restarted, because drive power is not transmitted to the wheels, even if the vehicle is not braked, the vehicle is prevented from starting to move. Thereby, it becomes possible to prevent setting off at a timing that the driver does not expect when returning from an idling-stop state.

It is preferable that the shift control device according to the present invention further includes: a gradient detecting means that detects a gradient of a road surface. It is preferable that the switching control means, in a case of the selection information for selecting the reverse travel range being output during the idling stop, switches the shift range of the automatic transmission to the parking range when the vehicle is not braked and the gradient of the road surface detected by the gradient detecting means is greater than a predetermined threshold.

In particular, in the case of the gradient of a road surface being greater than a predetermined threshold, the range of the automatic transmission is switched to the parking range. For that reason, when for example stopped on a slope or the like, it becomes possible to reliably prevent the vehicle from starting to move even if the vehicle is not braked.

It is preferable that the shift control device according to the present invention, further includes: a warning means that, in a case of the selection information for selecting the reverse travel range being output during the idling stop, issues a warning to a driver when the shift range of the automatic transmission is switched by the switching control means to a shift range other than the reverse travel range, and the shift range of the automatic transmission is maintained by the switching control means.

Accordingly, a warning is issued to the driver when a switching operation that differs from the driver's operation (request) or a maintenance operation is performed, and thus it is possible to alert the driver.

Advantageous Effects of Invention

According to the present invention, in a vehicle equipped with an idling-stop mechanism and a shift-by-wire mechanism, it is possible to prevent setting off at a timing that the driver does not expect when returning from an idling-stop state (during engine automatic restart).

MODE(S) FOR CARRYING OUT THE INVENTION

Figure 1:
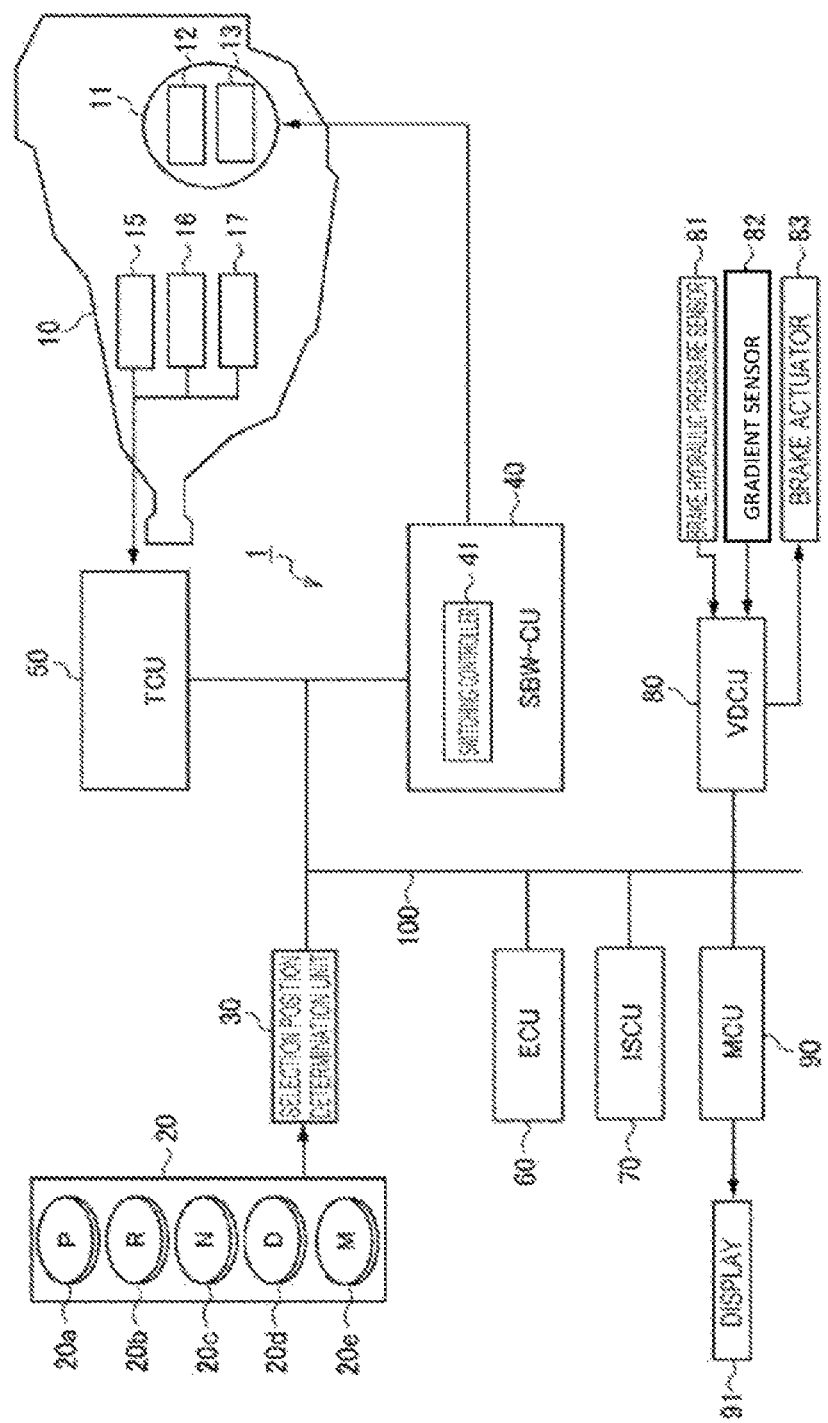
FIG. 1 is a block drawing illustrating the constitution of the shift control device according to the implementation.

Hereinbelow, the preferred implementation of the present invention will be described in detail with reference to the drawings. Note that the same reference numerals shall be used for the same or equivalent portions. Also, in each of the drawings, the same reference numerals are appended to the same elements, with overlapping descriptions thereof being omitted.

First, using FIG. 1, the constitution of the shift control device 1 according to the implementation will be described. FIG. 1 is a block drawing illustrating the constitution of the shift control device 1.

The shift control device 1 chiefly includes a selector 20 that receives operations for selecting the shift range of the automatic transmission 10, a selection position determination unit 30 that generates and outputs selection information in accordance with the selected shift range, and a shift-by-wire control unit 40 that switches the shift range of the automatic transmission 10 based on the selection information, and in a vehicle that has an idling-stop mechanism and in which a shift-by-wire type automatic transmission 10 is mounted, has a function of preventing setting off at a timing that the driver does not expect (does not intend) when returning from an idling-stop state (during engine automatic restart).

The automatic transmission 10 is connected to the output shaft of the engine (abbreviated in the drawing), and converts and outputs the drive power from the engine. Here, as the automatic transmission 10 it is possible to give as examples a stepped automatic transmission that includes a torque converter having a lock-up clutch function and a torque amplification function, and a transmission including a shift gear train and a control valve (hydraulic mechanism), and being constituted to be capable of automatic gear changing by the control valve, and a chain-type continuously variable transmission (CVT). Note that in the present implementation, a CVT is adopted. The drive force input from the engine, after being converted by the automatic transmission 10, is transmitted from the output shaft of the automatic transmission 10 to the drive wheels of the vehicle via the differential gear, drive shaft and the like (abbreviated in the drawing).

A shift-by-wire actuator (hereinbelow called "SBW actuator") 11 that is electrically connected with the shift-by-wire control unit (hereinbelow called "SBW-CU") 40 and that switches the shift range of the automatic transmission 10 in accordance with a control signal (drive signal) from the SBW-CU 40 is attached to the automatic transmission 10. Note that the SBW-CU 40 and the SBW actuator 11 may be integrally formed.

The SBW actuator 11, in accordance with the control signal from the SBW-CU 40, actuates a manual valve of the automatic transmission 10 to switch the shift range of the automatic transmission 10. The SBW 11 includes an electric motor 12 that actuates the manual valve and a position sensor 13 that detects the position of the manual valve, that is, the shift range of the automatic transmission 10. Here, the automatic transmission 10 is constituted to take on five shift ranges, namely, a parking range (parking (P) range), a reverse travel range (reverse (R) range), a neutral range (neutral (N) range), a forward travel range (drive (D) range), and a manual range (manual (M) range).

Also, in for example the center console of the vehicle, there is provided a selector 20 that accepts operations to alternatively select the shift range of the automatic transmission 10 by the driver, and output an electrical signal (selection signal) corresponding to the accepted selection operation. The selector 20 has for example five switches, namely, a parking (P) switch 20a that selects the parking range (P range), a reverse (R) switch 20b that selects the reverse travel range (R range), a neutral (N) switch 20c that selects the neutral range (N range), a drive (D) switch 20d that selects the forward travel range (D range), and a manual (M) switch 20e that selects the manual shift range (M range). For these five switches 20a to 20e, automatic reset switches (momentary switches) are favorably employed that enter the ON state only while being depressed by a finger or the like, and return to the OFF state once the finger is removed.

The selector 20 is electrically connected with the selection position determination unit 30, and outputs an electrical signal (selection signal) corresponding to the depressed switch to the selection position determination unit 30. Note that a lever-type selector mechanism may be used instead of the selector 20.

The selection position determination unit 30 reads in the electrical signal (that is, the switch input) from the selector 20, generates selection information corresponding to the selected shift range, and outputs it. More specifically, the selection position determination unit 30 is connected to the shift-by-wire control unit (hereinbelow SBW-CU 40.

As stated above, the SBW-CU 40 is electrically connected with the SBW actuator 11. Also, the SBW-CU 40 is via the CAN 100 communicatively connected with the selection position determination unit 30, a transmission control unit (hereinbelow called "TCU") 50, an engine control unit (hereinbelow called "ECU") 60, an idle-stop control unit (hereinbelow called "ISCU") 70, a vehicle dynamic control unit (hereinbelow called "VDCU") 80, and a meter control unit (hereinbelow called "MCU") 90.

Here, a description of each control unit will be given. First, the TCU 50 governs the transmission control of the automatic transmission 10. An output shaft rotation sensor 16, a range switch (inhibitor switch: a switch that electrically inhibits so that the starter motor does not rotate other than in the P range and the N range) 17 and the like provided in the automatic transmission 10 are connected to the TCU 50. Also, the TCU 50, through the CAN 100, receives information such as the engine rotation speed and the accelerator pedal opening transmitted from the ECU 60, and information such as the shift range of the automatic transmission 10 transmitted from the SBW-CU.

Based on various information such as the acquired engine rotation speed, output shaft rotation speed (vehicle speed), accelerator pedal opening, and shift range, the TCU 50 drives a solenoid valve constituting a control valve 15 and performs transmission control of the automatic transmission 10. Here, the control valve 15 controls hydraulic pressure for shifting the automatic transmission 10. More specifically, the control valve 15, by using a spool valve and a solenoid valve that actuates the spool valve to open and close an oil passage, supplies hydraulic pressure generated by an oil pump to for example a drive pulley or driven pulley. Note that the TCU 50 transmits various information of the automatic transmission 10 to the SBW-CU 40 via the CAN 100.

The ECU 60, based on detection signals input from the various sensors, obtains various information such as the engine rotation speed, intake air amount, air-fuel ratio of the gaseous mixture, accelerator pedal opening, and based on the various acquired information, comprehensively controls the engine by controlling the fuel injection and ignition, and various actuators. The ECU 60 transmits information such as the engine rotation speed that has been acquired to the SBW-40 via the CAN 100.

The ISCU 70 automatically stops the engine when a predetermined idling stop condition is satisfied in order to reduce fuel consumption and reduce emissions that are exhausted. Afterward, when a predetermined idling stop release condition is satisfied, the ISCU 70 restarts the engine. The ISCU 70 transmits information showing that an idling stop is underway to the SBW-CU 40 via the CAN 100.

A brake hydraulic pressure sensor 81 that detects the master cylinder pressure of the brake actuator 83, and an acceleration sensor 82 that detects front/rear and left/right acceleration are connected to the VDCU 80. Note that the acceleration sensor 82 may also function as a gradient detecting means that detects the gradient of a road surface. The VDCU 80 drives the brake actuator 83 in accordance with the brake pedal operation amount to brake the vehicle, and detects the vehicle behavior by various sensors (for example a wheel speed sensor, a steering angle sensor, the acceleration sensor 82, a yaw rate sensor and the like), inhibits sideslip and ensures vehicle stability during turns by brake control by automatic pressurization and engine torque control. The VDCU 80 transmits braking information (vehicle braking information) and gradient information of the road surface and the like to the SBW-CU 40 via the CAN 100.

The MCU 90 is connected with a display 91 that has an LCD display and a speaker disposed for example in a meter or on the dashboard, and by driving the display 91 presents to the driver the state of the vehicle and automatic transmission and various information. In particular, in the case of an operation to select the reverse travel range (R range) being received during an idling stop, when the shift range of the automatic transmission 10 is switched to a range other than the reverse travel range, and the shift range of the automatic transmission 10 is maintained, the MCU 90 issues a warning and/or information to the driver. In that event, the MCU 90 drives the display 91 to display the message of for example "Please perform shift operation while stepping on the brake," or outputs a "beep" warning tone.

Based on the selection information received from the selection position determination unit 30, the idling stop information received from the ISCU 70, the braking information (braking information) and road surface gradient information received from the VDCU 80, various input information received from the TCU 50, and engine rotation speed and the like received from the ECU 60, the SBW-CU 40 generates and outputs a control signal (motor drive signal), and switches the shift range of the automatic transmission 10 by driving the SBW actuator 11.

For that reason, the SBW-CU 40 is functionally equipped with a switching controller 41. The SBW-CU 40 includes a microprocessor that performs operations, ROM that stores programs and the like for causing the microprocessor to execute processes, RAM that stores various data such as operation results, backup RAM in which the stored content is held by a 12V battery, and input/output I/F. By the execution of a program stored in ROM by the microprocessor, the function of the switching controller 41 is realized in the SBW-CU 40.

The switching controller 41 outputs a control signal (motor drive signal) to the SBW actuator 11 in accordance with the selection information output by the selection position determination unit 30, and switches the shift range of the automatic transmission 10.

In particular, in the case of an operation to select the reverse travel range (R range) being received during an idling stop, the switching controller 41 switches the shift range of the automatic transmission 10 to the reverse travel range when the vehicle is braked. On the other hand, in the case of an operation to select the reverse travel range (R range) being received during an idling stop, the switching controller 41 switches the shift range of the automatic transmission 10 to the neutral range (N range) or the parking range (P range) when the vehicle is not braked and the range of the automatic transmission 10 is the forward travel range (D range).

Also, in the case of an operation to select the reverse travel range (R range) being received during an idling stop, the switching controller 41 maintains the shift range of the automatic transmission 10 without switching when the vehicle is braked and the shift range of the automatic transmission 10 is other than the forward travel range (D range) (that is, when it is the P range or N range).

Note that in the event of switching to the N range/P range or in the event of maintaining the N range/P range as described above, it is preferable that the switching controller 41 switch the shift range of the automatic transmission 10 to the parking range (P range) when the gradient of the road surface is greater than a predetermined threshold (for example, 30 degrees).

Note that in the case of an operation to select the reverse travel range (R range) being received during an idling stop, when the shift range of the automatic transmission 10 is switched to a shift range other than the reverse travel range, and the shift range of the automatic transmission 10 is maintained, an warning and/or information is issued to the user. More specifically, in the display 91 the message "Please perform shift operation while stepping on the brake," is displayed, or a "beep" warning tone is output.

Figure 2:
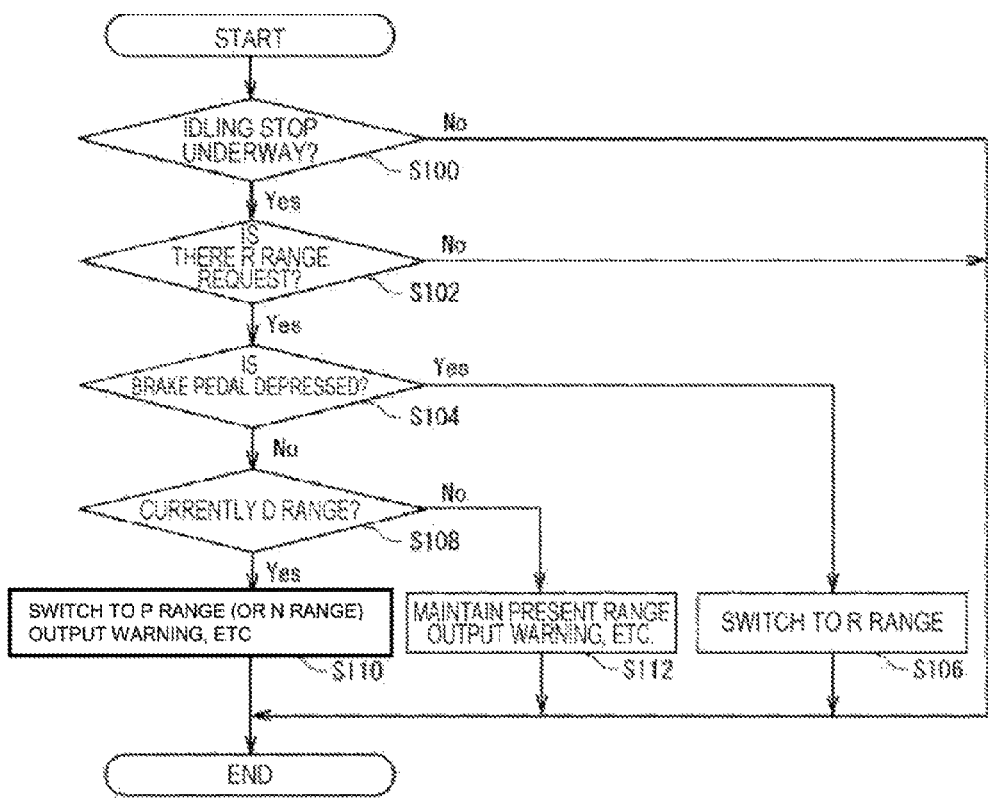
FIG. 2 is a flowchart illustrating the processing procedure of the shift range switching process by the shift control device according to the implementation.

Next, referring to FIG. 2, the operation of the shift control device 1 will be described. FIG. 2 is a flowchart illustrating the processing procedure of the shift range switching process by the shift control device 1. The processing is repeatedly executed at every predetermined time (for example, every 10 ms) in the SBW-CU 40.

In Step S100, a judgment is made as to whether or not an idling stop is underway (automatic stop of the engine is underway). Here, in the case of an idling stop not being underway, that is, in the case of the engine running, this processing is once exited. On the other hand, in the case of an idling stop being underway, the processing transitions to Step S102.

In Step S102, a judgment is made as to whether or not an R range request was detected by the selection position determination unit 30 (whether or not the R range switch 20b has been pushed down. Here, in the case of an R range request not being detected, this processing is once exited. On the other hand, when an R range request has been detected, the processing transitions to Step S104.

In Step S104, a judgment is made as to whether or not the brake pedal is depressed (whether or not the vehicle is braked). Here, in the case of the brake pedal being depressed (that is, in the case of the vehicle being braked), the processing transitions to Step S106. On the other hand, in the case of the brake pedal not being depressed, the processing transitions to Step S108.

In Step S106, the SBW actuator 11 is driven so that the shift range of the automatic transmission 10 becomes the R range, and the shift range is switched to the R range. Afterward, this processing is once exited.

On the other hand, in Step S108, a judgment is made as to whether or not the present shift range of the automatic transmission 10 is the D range. Here, in the case of the present shift range being the D range, the processing transitions to Step S110. On the other hand, in the case of present the shift range not being the D range, the processing transitions to Step S112.

In Step S110, the SBW actuator 11 is driven so that the shift range of the automatic transmission 10 becomes the P range (or N range), and the shift range is switched to the P range (or N range). Afterward, this processing is once exited. Note that, here, in the case of the gradient of the road surface detected by the acceleration sensor (gradient sensor) 82 being greater than a predetermined threshold (for example, 30 degrees), it is switched to the P range, and when the gradient of the road surface is equal to or less than the aforementioned predetermined threshold, it may be switched to the N range (or P range). Also, in Step S110, a warning and/or information (for example, a "beep" warning tone or display of "Please perform shift operation while stepping on the brake") is output to the driver. Afterward, this processing is once exited.

On the other hand, when the present shift range is not the D range (that is, when it is the N range or P range), in Step S112, switching to the R range is prohibited, and the present shift range is maintained. Also, in Step S112, a warning and/or information is output to the driver. Afterward, this processing is once exited.

As described above, according to the present implementation, in the case of selection information to select the reverse travel range (R range) being output during an idling stop, when the vehicle is not braked and the shift range of the automatic transmission 10 is not in the forward travel range (D range), the shift range of the automatic transmission 10 is switched to the neutral range (N range) or the parking range (P range). For that reason, even if the idling stop is released whereby the engine is automatically restarted, because drive power is not transmitted to the wheels, even if the vehicle is not braked, the vehicle is prevented from starting to move. Thereby, it becomes possible to prevent setting off at a timing that the driver does not expect (does not intend) when returning from an idling-stop state (during engine automatic restart). Note that the shift range of the automatic transmission 10 is switched to the reverse travel range (R range) when the vehicle is braked, but at this time the vehicle is braked, and thus there is no setting off of the vehicle (starting to move rearward) against the intention of the driver.

Also, according to the present implementation, in the case of selection information to select the reverse travel range (R range) being output during an idling stop, when the vehicle is not braked and the shift range of the automatic transmission 10 is other than the forward travel range (D range), the range of the automatic transmission 10 is maintained in a range other than the forward travel range, that is, the neutral range (N range) or the parking range (P range), without being switched to the reverse travel range (R range). For that reason, even if the idling stop is released whereby the engine is automatically restarted, because drive power is not transmitted to the wheels, even if the vehicle is not braked, the vehicle is prevented from starting to move. Thereby, it becomes possible to prevent setting off at a timing that the driver does not expect when returning from an idling-stop state.

According to the present implementation, in the case of selection information to select the reverse travel range (R range) being output during an idling stop, when the vehicle is not braked, and the gradient of the road surface is greater than a predetermined threshold, the range of the automatic transmission 10 is switched to the parking range (P range). For that reason, when for example stopped on a slope or the like, it becomes possible to reliably prevent the vehicle from starting to move even if the vehicle is not braked.

Also, according to the present implementation, in the case of selection information to select the reverse travel range (R range) being output during an idling stop, when the shift range of the automatic transmission 10 is switched to a shift range other than the reverse travel range (R range) and the shift range of the automatic transmission 10 is maintained, a warning is issued to the driver. For that reason, when a switching operation that differs from the operation (request) of the driver, or a maintaining operation is performed, it is possible to alert the driver.

The implementation of the present invention was described above, but the present invention is not limited to the above implementation, with various modifications being possible. For example, the system constitution of the aforementioned implementation is one example, and the system constitution of the present invention is not limited to the aforementioned implementation. For example, the SBW-CU 40 and the SBW actuator 11 may be integrated. Also, the SBW-CU 40 and the TCU 50 may be one unit. Also, the SBW-CU 40 and the selection position determination unit 30 may be consolidated into one unit. Moreover, the ECU 60 and the ISCU 70 may be consolidated into one unit.

REFERENCE SIGNS LIST 1 shift control device
10 automatic transmission
11 shift-by-wire actuator
20 selector
30 selection position determination unit
40 shift-by-wire control unit
41 switching controller
50 transmission control unit
60 engine control unit
70 idle-stop control unit
80 vehicle dynamic control unit
81 brake hydraulic pressure sensor
82 acceleration sensor (gradient sensor)
83 brake actuator
90 meter control unit
91 display
100 CAN

The invention claimed is:

1. A shift control device of a vehicle equipped with an idling-stop mechanism and a shift-by-wire mechanism, the shift control device comprising:
a selector that receives an operation to select a shift range of an automatic transmission and outputs a selection information corresponding to the operation;
a switch controller that switches the shift range of the automatic transmission in accordance with the selection information output by the selector; and
a brake actuator that brakes the vehicle,
wherein the switch controller, in a case of a selection information for selecting a reverse travel range being output by the selector during an idling stop,
switches the shift range of the automatic transmission to the reverse travel range when the vehicle is braked by the brake actuator, and
switches the shift range of the automatic transmission to a neutral range or a parking range when the vehicle is not braked and the shift range of the automatic transmission is a forward travel range.

2. The shift control device according to claim 1, wherein the switch controller, in a case of the selection information for selecting the reverse travel range being output by the selector during the idling stop,
maintains the shift range of the automatic transmission without switching the shift range of the automatic transmission when the vehicle is not braked and the shift range of the automatic transmission is other than the forward travel range.

3. The shift control device according to claim 1, further comprising:
a gradient sensor that detects a gradient of a road surface,
wherein the switch controller, in a case of the selection information for selecting the reverse travel range being output during the idling stop,
switches the shift range of the automatic transmission to the parking range when the vehicle is not braked and the gradient of the road surface detected by the gradient sensor is greater than a predetermined threshold.

4. The shift control device according to claim 1, further comprising:
a warning unit that, in a case of the selection information for selecting the reverse travel range being output during the idling stop, issues a warning to a driver when the shift range of the automatic transmission is switched by the switch controller to a shift range other than the reverse travel range, and the shift range of the automatic transmission is maintained by the switch controller.

5. The shift control device according to claim 2, further comprising:
a gradient sensor that detects a gradient of a road surface,
wherein the switch controller, in a case of the selection information for selecting the reverse travel range being output during the idling stop,
switches the shift range of the automatic transmission to the parking range when the vehicle is not braked and the gradient of the road surface detected by the gradient sensor is greater than a predetermined threshold.

6. The shift control device according to claim 2, further comprising:
a warning unit that, in a case of the selection information for selecting the reverse travel range being output during the idling stop, issues a warning to a driver when the shift range of the automatic transmission is switched by the switch controller to a shift range other than the reverse travel range, and the shift range of the automatic transmission is maintained by the switch controller.

7. The shift control device according to claim 3, further comprising:
a warning unit that, in a case of the selection information for selecting the reverse travel range being output during the idling stop, issues a warning to a driver when the shift range of the automatic transmission is switched by the switch controller to a shift range other than the reverse travel range, and the shift range of the automatic transmission is maintained by the switch controller.

8. The shift control device according to claim 5, further comprising:
a warning unit that, in a case of the selection information for selecting the reverse travel range being output during the idling stop, issues a warning to a driver when the shift range of the automatic transmission is switched by the switch controller to a shift range other than the reverse travel range, and the shift range of the automatic transmission is maintained by the switch controller.

* * * * *